R. Leavitt.
Skirt Elevator.

Nº 41,382. Patented Jan. 26, 1864.

Witnesses.

Inventor.
Rufus Leavitt

UNITED STATES PATENT OFFICE.

RUFUS LEAVITT, OF MELROSE, MASSACHUSETTS.

IMPROVEMENT IN LADIES' SKIRT-LIFTERS.

Specification forming part of Letters Patent No. 41,382, dated January 26, 1864.

*To all whom it may concern:*

Be it known that I, RUFUS LEAVITT, of Melrose, in the county of Middlesex and State of Massachusetts, have invented a new and useful Improvement in the Construction of the Skirts of Ladies' Dresses; and I do hereby declare that the following is a full, clear, and exact description of the same, taken in connection with the accompanying drawings, making a part of this specification, in which—

Figure 1:
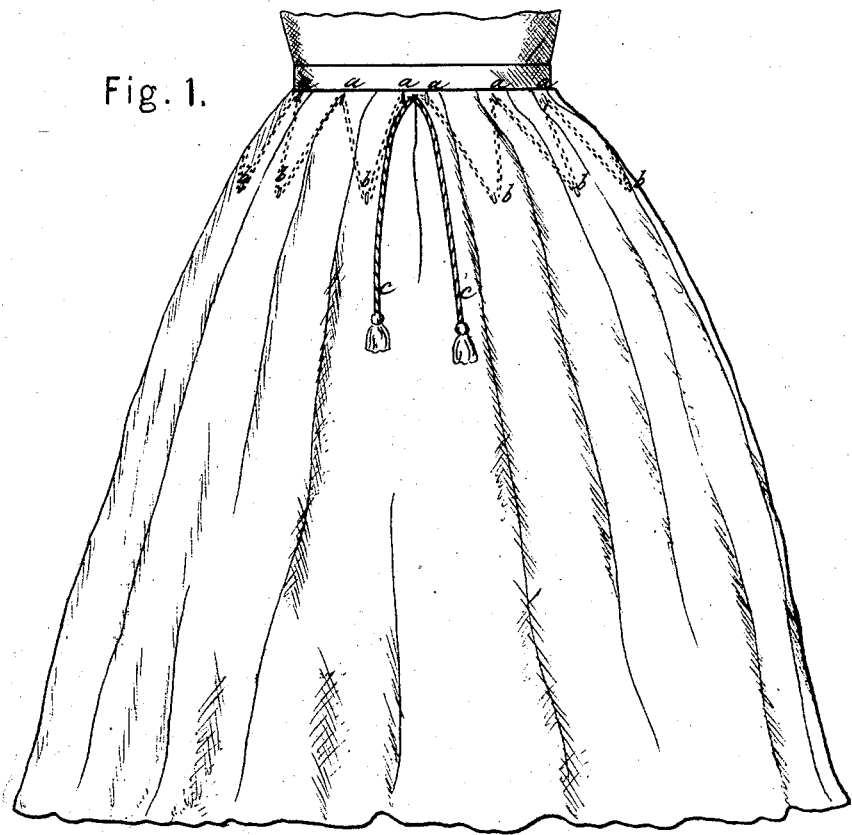
Figure 3:
Figure 2:
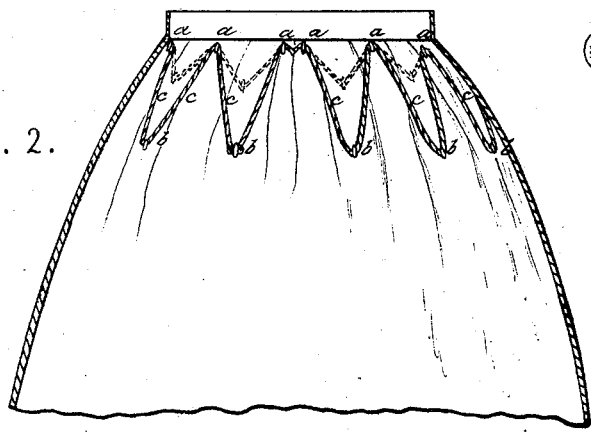
Figure 4:

Figure 1 is an external elevation of the skirt. Fig. 2 is a vertical section of the upper part of the same, and Figs. 3 and 4 represent two forms of eyes used for this purpose.

The subject-matter of my invention is more particularly applicable to the construction of ladies' dresses having long skirts; and it consists in the employment therewith of two series of eyelets attached to the interior, with a cord interlacing them, by means of which the wearer, by drawing the ends of the cord which come to the exterior, can shorten the length of the skirt and raise it from the ground, or allow it to fall by reversing the operation.

In the drawings, *a a*, &c., represent a row of eyelets of a peculiar construction, attached to the inside of the skirt near the waist at regular intervals, as shown, but at the placket having two eyelets, one upon either side of the opening. At a distance below this, somewhat greater than the amount that it is desired to shorten the skirt, another row of eyelets *b b*, &c., is attached, which I prefer to place intermediate between the first, as is shown in the drawings. A cord, *c*, is then passed alternately through the eye-lets in each row, and the ends are led through the placket to the outside, as seen in Fig. 1.

If it is desired to raise the skirt more in one part than another, the eyelets *b* would be placed lower at that part. When it is desired to raise the skirts—as, for instance, when walking—the wearer has but to draw the external ends of the cord *c*, which brings the eyelets *b* to the position shown by the red lines in Fig. 2, and fasten them by a knot, thus shortening the skirt an amount equal to the difference in the height of the two positions of the eyelets *b*, and by releasing the cord the skirt falls to its usual position.

Fig. 3 represents one form of making the eyelets, and Fig. 4 represents another form, both of them made from wire, the peculiarity of both being that the axis of the eye is parallel to the plane of the surface upon which they are sewed, and the whole eye projects inward from that surface, so that when attached the cord can render freely through them. They may be made of various forms and of a variety of materials, but those shown are simple, cheap, and efficient, and represent the character that they should have to adapt them to their purpose.

Having thus described my invention what I claim is—

Making the skirt with a series of eyes attached at or near the belt, and another series at a suitable distance below the same, and interlacing them by a cord, substantially in the manner and for the purpose described.

Executed at Boston this 9th day of October, 1863.

RUFUS LEAVITT.

Witnesses:
WM. C. HIBBARD,
A. C. WASHBURN.